Jan. 31, 1967 P. OCHNER 3,300,816
MOLD FOR ACCUMULATOR CASE
Filed Sept. 1, 1964
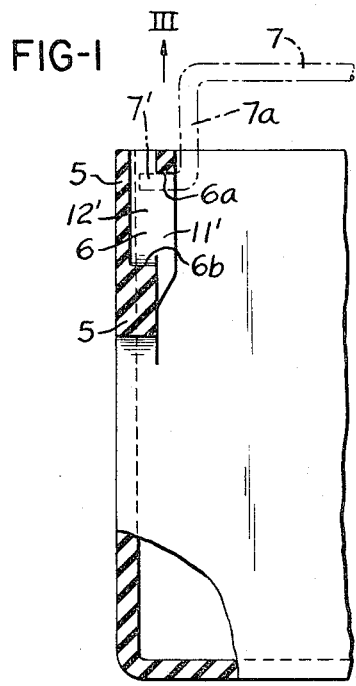
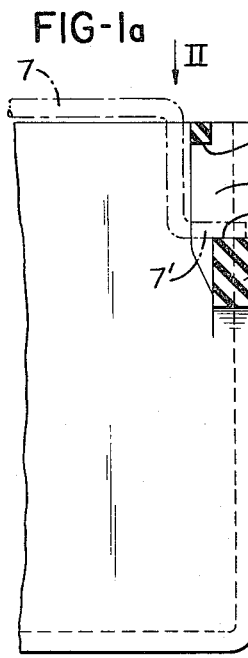
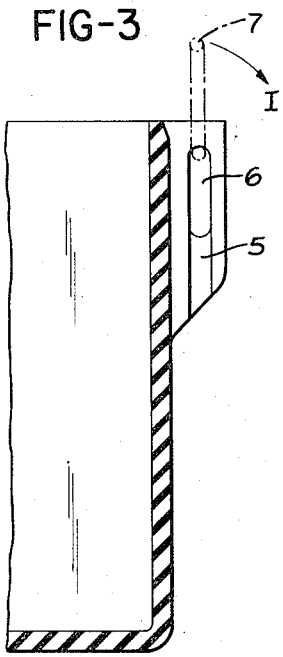
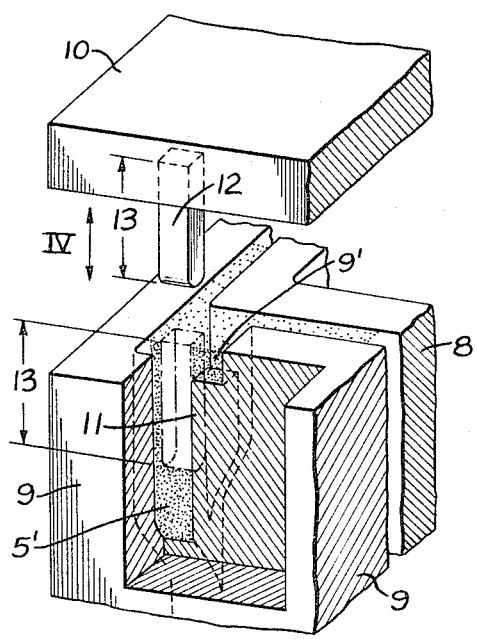
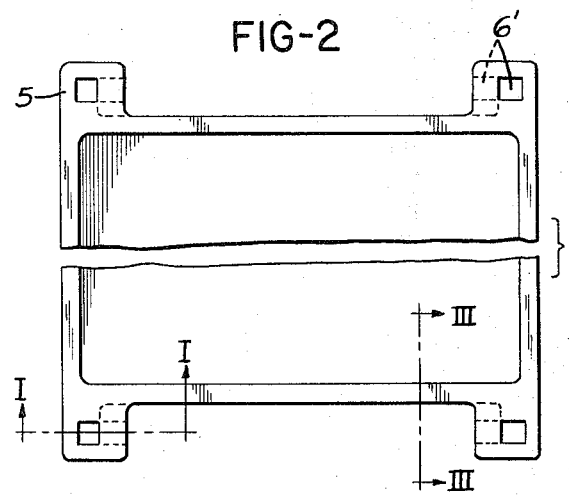
INVENTOR.
Paul Ochner
BY

United States Patent Office 3,300,816
Patented Jan. 31, 1967

3,300,816
MOLD FOR ACCUMULATOR CASE
Paul Ochner, Gehrden, Hannover, Germany, assignor to Continental Gummi-Werke Aktiengesellschaft, Hannover, Germany
Filed Sept. 1, 1964, Ser. No. 393,633
Claims priority, application Germany, Sept. 7, 1963, C 30,858
1 Claim. (Cl. 18—42)

The present invention relates to a mold for a case, especially an accumulator case, which is composed of hard rubber or similar synthetic material. More particularly, the present invention relates to a mold for a case of the above-mentioned type with longitudinal recesses at opposite sides of the case for tiltably and displaceably journalling the handles for carrying such case. The invention also concerns a mold for cases of the above character in which oppositely located side surfaces have jaw-like protrusions.

The mounting of the handles in oblong recesses is frequently desired in order to provide larger handle openings to permit a more comfortable carrying of the accumulator battery in the case. Such mounting of the handles furthermore has the advantage that the handles themselves can absorb stresses when the battery is installed in the case. In this instance, the handles rest on the oblong recess confining lower wall surface, whereas, for taking up the battery weight, said handles rest at the oblong recess confining upper wall surface.

Heretofore, it has been necessary, after the accumulator box had been completed, to work said recesses into the accumulator case by a chip-removing operation, or additional metallic fittings had to be installed to form such recesses. These heretofore known methods are rather cumbersome, time-consuming, and greatly increase the manufacturing costs.

It is an object of this invention to provide a mold for producing simplified accumulator cases.

This object and other objects and advantages of the invention will appear more clearly from the following specification in connection with the accompanying drawing, in which:

FIGURE 1 illustrates, partly in end view and partly in section, one side of an accumulator case made by means of a mold according to the present invention, said section being taken along the line I—I of FIGURE 2;

FIGURE 1a is a section similar to that of FIGURE 1 but with a differently shaped lateral recess;

FIGURE 2 is a top view of an accumultor case as shown in FIGURE 1;

FIGURE 3 is a section taken along the line III—III of FIGURE 2;

FIG. 4 shows details of a mold according to the invention for making an accumulator case of FIG. 1.

The present invention concerns a mold for an accumulator case of hard rubber or similar synthetic material with oblong recesses and opposite side surfaces for tiltably and displaceably mounting the handles, or with jaw-like extensions on said side surfaces, which accumulator case is characterized primarily in that said recesses in longitudinal direction thereof are confined by abutments offset with regard to each other.

The arrangement of the said recesses is of particular importance in connection with the manufacture of accumulator cases inasmuch as by means of the mold according to the present invention it makes possible an economic molding of the recesses simultaneously with the molding of the remainder of the case. Therefore, in conformity with the present invention, it is suggested to form said recesses on parts of the mold which are movable relative to each other and which in closed condition of the mold, form fixed protrusions engaging each other over a considerable portion of their length.

Referring now to the drawing in detail, FIGS 1, 1a and 3 illustrate an accumulator case made by means of a mold according to the present invention which is made of hard rubber and has two oppositely located relatively short and two oppositely located relatively long sides. The two relatively short sides have jaw-like protruding extensions 5 with longitudinal recesses 6 for receieving and supporting handles 7. These handles 7 may consist of round wire bent in the shape of a U and provided with arms 7' extending perpendicularly with regard to the legs 7a of said handle. The said arms 7' are guided in said recesses 6 in such a way that they may be tilted along a circle, as indicated by the arrow I in FIG. 3 about the axis of arms 7' and may also be displaced parallel to the end walls of the case along a straight line by a distance corresponding to the length of said recesses 6. FIG. 1 shows the handle 7 in its upper or carrying position. When handle 7 of FIG. 1 is moved downwardly in said recesses 6 until the arms 7' abut the lower end walls confining the recesses 6, the arms 7' rest on said lower end walls and convey thereto the clamping forces upon the case. This may be helpful when the battery is to be clamped to its support.

When handles 7 occupy their uppermost position shown in FIG. 1, into which they are brought by pulling on said handles in the direction of the arrow III for transporting a battery in the case, the spacing between the transverse handle arm of handle 7 and the top of the casing or battery is sufficiently high to permit a comfortable carrying of the case and a battery therein.

FIG. 1 clearly shows the offset arrangement between the upper and lower abutment surfaces 6a and 6b of the recesses 6. The upper abutment against which handle arms 7' rest when carrying the battery by said handles has the form of a web or a bridge-like connecting member. By correspondingly dimensioning the cross-section of said abutments, it may be designed for the stresses to be expected, so that an accumulator case formed in the mold according to the present invention will by means of the recesses of the invention not be weakened over heretofore known accumulator cases with an oblong opening.

The lateral recess 6c of FIG. 1a slightly differs from the recess 6 of FIG. 1. However, also in this instance, arm 7' when in its lowermost position rests on the abutment surface 6b and when in its upper position rests on the abutment surface 6a. Also the abutment surfaces 6a and 6b are offset with regard to each other.

An accumulator case may be made according to the present invention by means of the mold shown in FIG. 4. This mold comprises primarily the outer mold plates 9 arranged around a stationary form case 8, and a mold lid 10 movable relative to said mold plates 9. Each mold plate 9 is provided with depressions 9' for forming the jaw-like extensions 5 in the accumulator case. In addition thereto, each mold plate 9 has fixedly connected thereto protrusions 11 which extend into the recesses 9' and which form part 11' of the respective recess 6. Mold lid 10, which is movable relative to the respective form plate 9 in the direction of the arrow IV, has fixed protrusions 12 of the same type which, when the mold is closed, will in the illustrated arrangement enter said recesses 9' from the top and will, with the completed accumulator case, form the outer portion 12' of recesses 6. The protrusions 11 and 12 are provided in pairs and arranged with regard to each other in such a way that during the course of the closing movement of the mold, they slide upon each other and will in closed condition of the mold overlap each other over a range 13 which corresponds to the length of each of the recesses 6. In this way, it is possible by simple means to produce oblong aperture-like recesses while avoiding the heretofore indispensable necessity of moving one or more mold sections in a direction different from the plane of the arrow IV.

The width of protrusions 12 in a direction perpendicular to the plane of the drawing, in conformity with FIG. 4, may be so selected that it coincides with the corresponding measure of the recesses 9' associated therewith. In this instance, a recess 6 is formed on the completed accumulator case, as shown in FIG. 1a. On the other hand, the protrusions 12 in this dimension may be narrower than the recesses 9' associated therewith, so that the corresponding recesses 6 can be closed toward the outside by a web-shaped closure wall 5' extending up to the upper edge of the accumulator case. The recess would then so-to-speak form a blind hole. The last-mentioned arrangement has the advantage that it will impart upon the extensions 5 a higher degree of rigidity and stress resistance with regard to occurring clamping and holding forces and furthermore creates a two-sided abutment surface for the end faces of the handle arms 7'.

As will be seen from the above, the molding of the recesses in conformity with the present invention eliminates the necessity of expensive machining of the finish-molded accumulator case. In other words, once the molding operation has been completed and the mold is opened after completed vulcanization, the accumulator case is complete in every respect and the only post-treatment consists in a customary trimming of the edges, whereupon the handles can immediately be inserted into the recesses without additional machining operations.

A particular advantage of the invention consists in that no mold technical steps as, for instance, the arrangement of lateral slides in the mold, or complicated foldable mold sections are required. The employed molds will not be fundamentally changed over heretofore known molds by the provisions of the parts producing the recesses according to the present invention. Also, the operational steps during the closing and opening of the mold are not affected by the protrusions according to the invention. As indicated above, the protrusions will preferably frictionally slide upon each other during the molding operation and will completely fill the space corresponding to the recesses to be molded. Even when the fitting of the mold sections is not precise or when the surface of the mold sections, in particular the overlapping protrusions, is somewhat faulty, material which might flow into the thus obtained space can for all practical purposes form a diaphragm-like thin skin only which can easily be removed during the subsequent trimming operation.

It is, of course, to be understood that the present invention is, by no means, limited to the particular mold shown in the drawings, but also comprises any modifications within the scope of the appended claim.

What is claimed is:

In a mold for forming a battery case with integral abutments spaced to receive a handle, separable side and end mold parts for an outer mold part defining a cavity corresponding to the side and end walls of the case to be molded, the outer mold part having a recess adjacent each corner extending downwardly from the upper margin and opening from said cavity, a lid for said mold having fixed thereon separable mold parts each in one of said downwardly extending recesses and terminating spaced above the bottom wall of said downwardly extending recess to form a lower abutment on said case having an upwardly facing abutment surface, each of said recesses being wider at its upper end and bordered by said outer mold part above said bottom wall and by said separable mold part to form an upper abutment having a downwardly facing abutment surface offset from said upwardly facing surface on the opposite side of a vertical plane, said cavity and recesses receiving the molding material and said lid with said separable mold parts being removable by upward movement from said outer mold part to form with said outer mold part recesses in said case between said abutment surfaces.

References Cited by the Examiner

UNITED STATES PATENTS

| | | | |
|---|---|---|---|
| 1,343,380 | 6/1920 | Weida. | |
| 1,358,903 | 11/1920 | Weida | 18—19 |
| 1,922,082 | 8/1933 | Dunzweiler | 206—2 |
| 2,141,791 | 12/1938 | Keller | 206—2 |
| 2,357,950 | 9/1944 | Goessling | 18—42 X |
| 2,592,296 | 4/1952 | Kutik | 264—318 |
| 3,182,218 | 5/1965 | Videtic | 18—45 X |

FOREIGN PATENTS 490,273    8/1938    Great Britain.

J. SPENCER OVERHOLSER, *Primary Examiner.*

J. HOWARD FLINT, Jr., *Examiner.*